May 5, 1964     R. H. ENGELMANN     3,132,252
PHOTOSENSITIVE AUTOMATIC HEADLIGHT CONTROL SYSTEM
Filed May 31, 1962     3 Sheets-Sheet 1
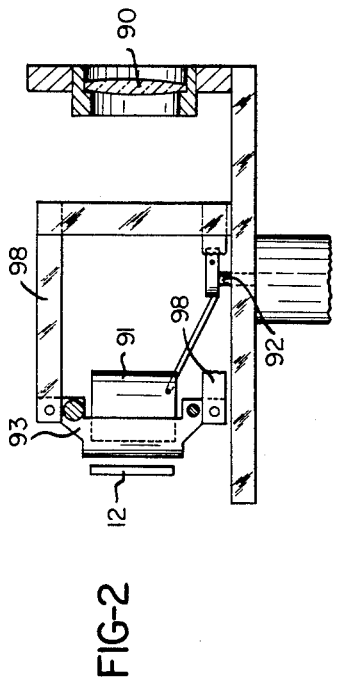
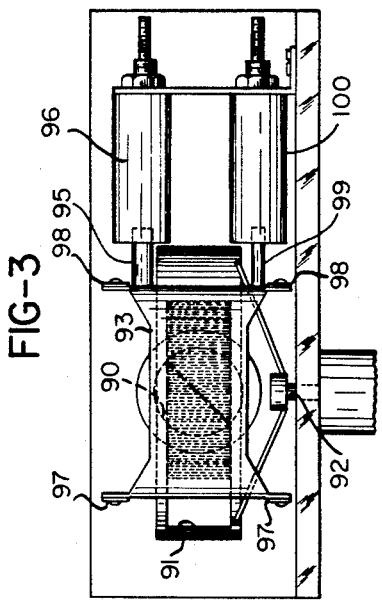
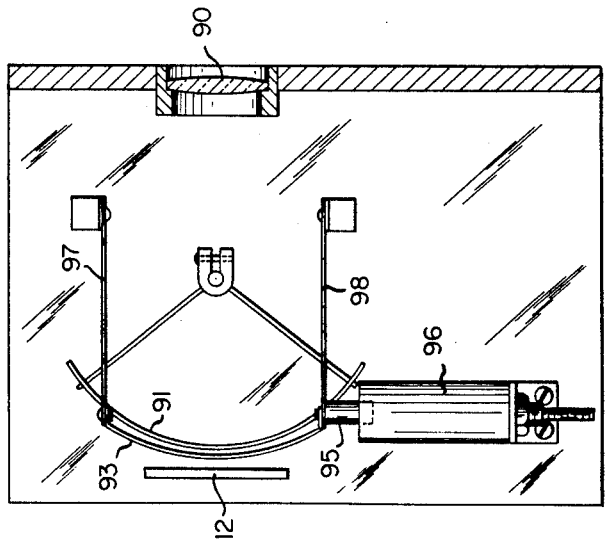
INVENTOR.
RICHARD H. ENGELMANN
BY Charles M. Hogan
ATTORNEY May 5, 1964 R. H. ENGELMANN 3,132,252
PHOTOSENSITIVE AUTOMATIC HEADLIGHT CONTROL SYSTEM
Filed May 31, 1962 3 Sheets-Sheet 2
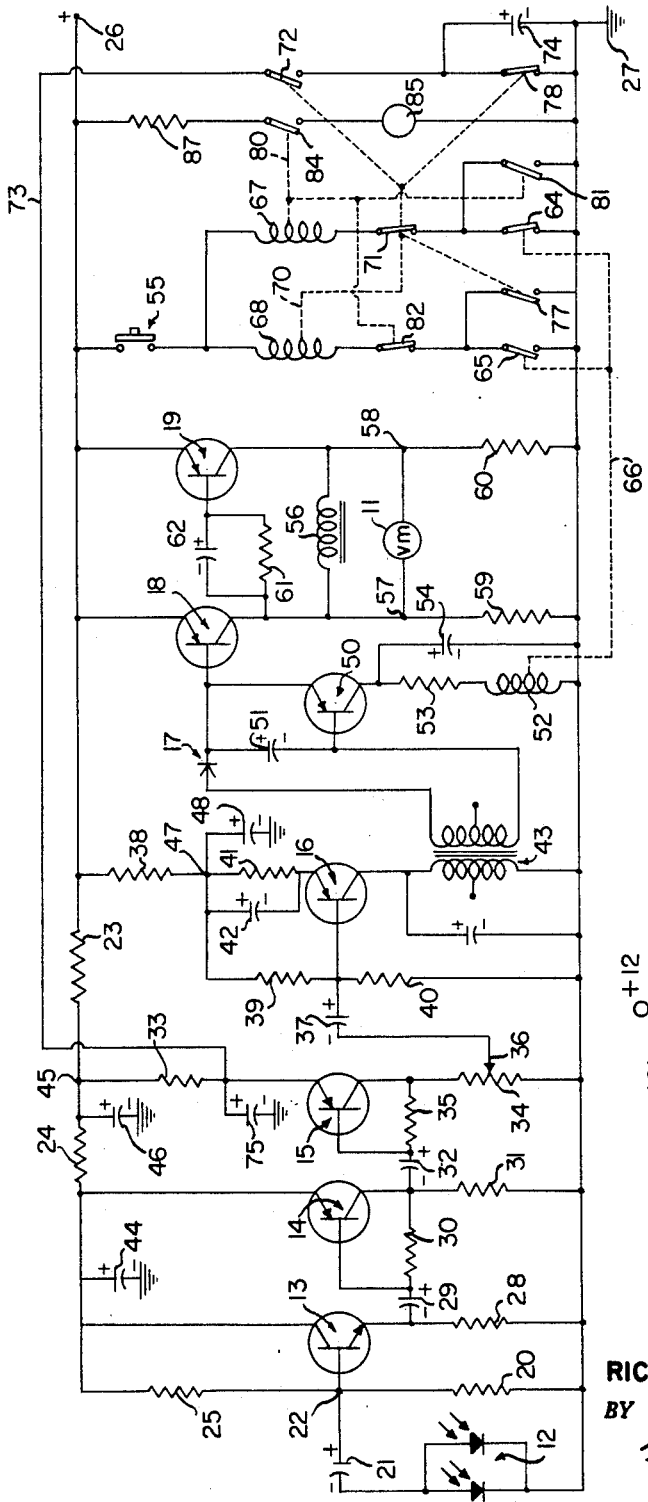
FIG-4
FIG-5
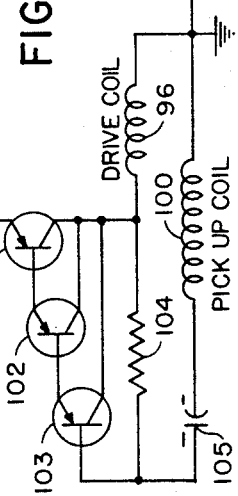
*INVENTOR.*
RICHARD H. ENGELMANN
BY *Charles M. Hogan*
ATTORNEY

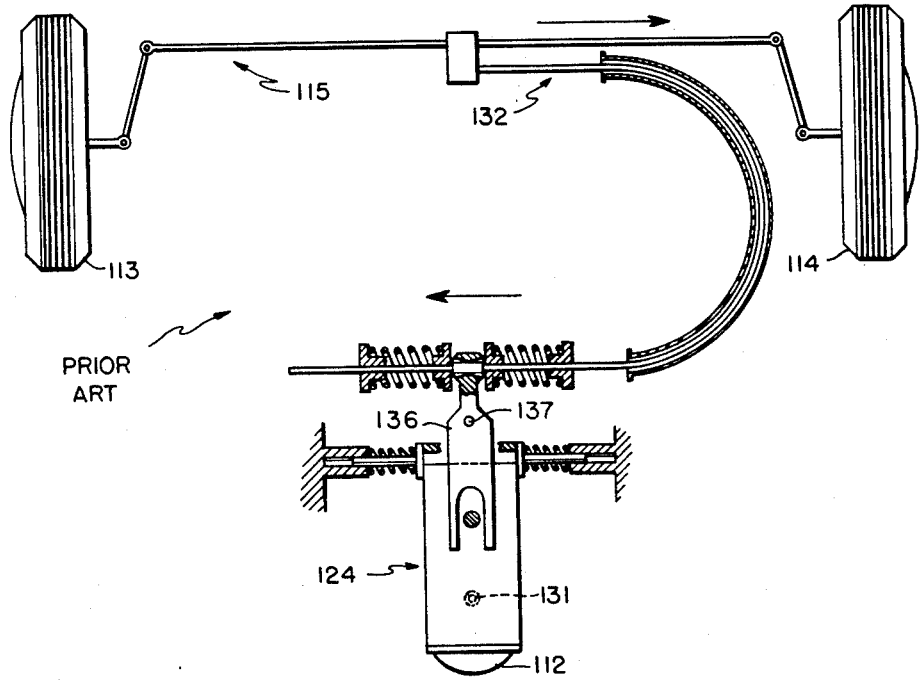
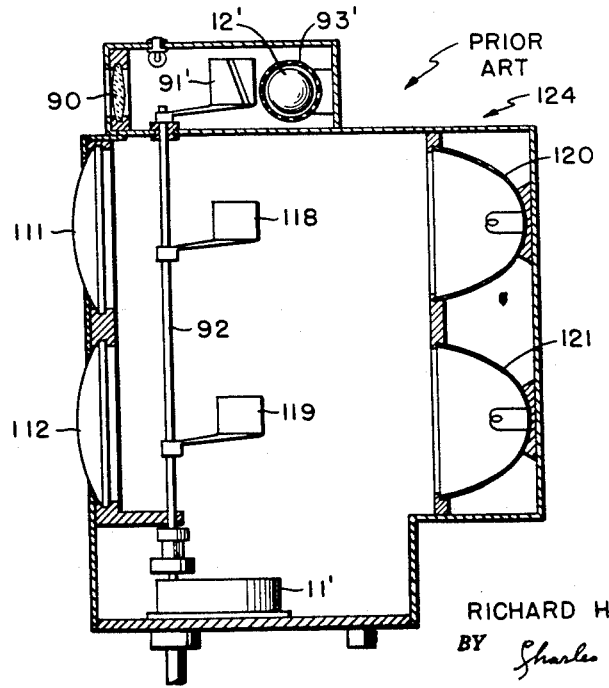

United States Patent Office 3,132,252
Patented May 5, 1964

3,132,252
PHOTOSENSITIVE AUTOMATIC HEADLIGHT
CONTROL SYSTEM
Richard H. Engelmann, Cincinnati, Ohio, assignor to
J. Page Hayden, Cincinnati, Ohio
Filed May 31, 1962, Ser. No. 198,900
11 Claims. (Cl. 250—214)

The present invention relates to vehicle headlight control systems generally and specifically to improvements in the basic Bone-type of control system illustrated in United States Patents Nos. 2,562,258 and 2,753,487 issued to Evan P. Bone and assigned by mesne assignments to J. Page Hayden, of Cincinnati, Ohio.

The Bone headlight control system is an electrical and optical installation in an automobile (i.e. equipped vehicle) which so functions that a non-glare shadow automatically is cast on the zone of an oncoming vehicle, as the passing approach is made, in order to protect its operator from disability and discomfort glare. The Bone system functions in such a way that the shadow tracks the approaching vehicle while light of such intensity as to effect greatly improved night visibility for the driver of the equipped vehicle is projected onto the right side of the road in front of the equipped vehicle throughout the approach. As the approaching vehicles finish passing each other the light is projected down the road centrally.

The Bone system is premised generally on a direction finder including photoelectric means for detecting the presence of an oncoming vehicle, in combination with a direction-finder vane which is positioned in azimuth, under the ultimate control of the photoelectric means, to measure the direction of approach of the oncoming vehicle (specifically, the relative bearing of the left or inner headlamp of the approaching vehicle, "inner" meaning closer to the center line of the highway). Synchronized with the direction-finder vane are vanes in specially constructed head lamps which function in such a way as to define the projection of light and to cause overlapping shadows or non-glare areas to track the approaching vehicle until it passes or comes alongside the equipped car, all as described in detail in the aforementioned Bone patents.

Improved systems of this character are described in the following additional United States patents, assigned to the same assignee as the present application and invention, and reference is made to such patents for a detailed description of such improvements, both as to structure and mode of operation:

Engelmann, 2,917,663, issued December 15, 1959
Engelmann and Foster, 2,917,666, issued December 15, 1959
Engelmann, 2,941,118, issued June 14, 1960
Dugle, 2,941,117, issued June 14, 1960

In the above-mentioned Dugle Patent 2,914,117 there is shown an improved Bone-type headlighting system in which the direction finder and headlamp vanes are carried in synchronism by the same shaft (92, FIG. 7 of the present application) and in which the supporting framework 124 for the headlamps and direction finder is steered with the car. The embodiment of the present invention herein shown is disclosed as used in conjunction with an improved Bone-type headlight system in accordance with the Dugle patent, but is not limited to utility therewith.

Reference is made to said Dugle patent for a description of the entire Dugle system and how it is related to the equipped car. Specifically as shown in FIGS. 6 and 7 of the present application, which figures correspond to FIGS. 2 and 3 of the Dugle Patent 2,941,117, the direction finder vane 91' (FIG. 7) and head lamp vanes 118 and 119 are carried in synchronism by the same shaft 92. Vanes 118 and 119 are azimuthally positioned in synchronism. Vane 118 directs the light beam passing from lamp 120 through lens 111 and vane 119 directs the light beam passing from lamp 121 through lens 112. Light from an oncoming car passes through lens 90 to phototube 12' and causes vane 91' to be positioned in accordance with the teachings of the above-mentioned Bone patents. The assembly of direction finder and lamps is disposed in a housing 124. The direction finder vane and lamp vanes are positioned by a photoelectrically controlled electronic circuit, including a vane motor 11'. Additionally, in accordance with the Dugle Patent 2,941,117, the entire housing 124 is turned to the right or left when the automobile in which the system is installed is turned to the right or left, respectively.

The present invention is directed to improvements in the direction finder. That is, the prior art direction finder which comprises the elements 90, 91', 93' and 12' of the Dugle patent, as illustrated and numbered in FIG. 7 of the present application, is improved in accordance with the present invention. Additionally, the electronic control circuitry of the prior art is improved in accordance with the present invention.

It has been mentioned that the entire housing 124 is "steered with the car." This is accomplished in accordance with the teachings of the Dugle patent by the mechanism illustrated in FIG. 6, which corresponds to FIG. 2 of the Dugle patent. Suffice it to say that the wheels 113 and 114 of the automobile are positioned by a conventional linkage 115. The headlamp and direction finder casing 124 is mechanically turned and coordinated with the steering linkage 115 through the means illustrated in FIG. 6. The casing 124 is secured for rotation to a shaft 131. A push-control cable 132 is secured at one end to the linkage 115 and its other end is related to a link 136, pivoted at 137, in such a way that the housing 124 is steered in coordination with the orientation of the car, all in accordance with details pointed out in the Dugle Patent 2,941,117, to which reference is accordingly made.

The primary objects of the present invention are to provide: (1) An improved headlighting system in which a solar cell is used as a light detector. (2) A transistorized and greatly simplified control circuit for an automatic headlighting system. (3) A control circuit which is so simplified as radically to reduce the cost of production. (4) Improved drive circuitry for the vane motor. (5) Simplified "search" and "flash" circuitry. (6) A mechanically simplified direction finder. (7) An improved and cost-reduced device for discriminating against background light.

Parenthetically the functions performed by search and flash circuitry are fully described in the Engelmann-Foster Patent 2,917,666 and reference is accordingly made to such patent, specifically to the material beginning at column 2, line 47, and ending at column 4, line 30. Suffice it to say for the present that the vanes are turned counterclockwise for flash and clockwise for search by manually controlled overriding circuitry, which overrides the circuitry which automatically tracks the oncoming vehicle.

The expressions "search" and "flash" are now clarified in order to facilitate the explanation of the present invention. It is a matter of public notice that oncoming automobile operators frequently do not dim down their headlights. It is common practice for the victim of such circumstances to switch from down beam to up beam for an instant and then back to down beam in order to remind the offending driver of requisite courtesy and law. Now while the present invention and all Bone-type systems are "homing" or continuously operating devices in their normal operation, so that the offending driver would normally be protected by the non-glare shadow, normal operation can be overridden by turning the headlamp vanes counterclockwise, thus removing the non-glare shadow instantaneously from the offending vehicle. This "flashing" action corresponds to flashing an offending oncoming driver with bright beams in conventional headlighting systems.

Now Bone-type systems, as to which the present invention is an improvement, are designed automatically to respond at considerable range to the bright lights of an oncoming car. Oncoming cars with down beams will approach much more closely to a car equipped with the Bone-type of system than will oncoming cars with up or bright beams.

It is possible to cause the Bone-type system to respond to down beams of an oncoming car at increased range by overriding the normal automatic operation of the Bone system in such a manner as to turn the headlamp vanes clockwise. This is called a "search" operation and it causes the photoelectric system of Bone headlamps to begin to respond to down beams of oncoming headlamps at a range greater than the automatic response would be effective.

As stated above, "flash" and "search" are fully described in the aforementioned Engelmann-Foster patent. In the present invention the two overriding means are improved.

For a better understanding of the present invention, together with other and further objects, advantages and capabilities thereof, reference is made to the following description of the following drawings, in which:

FIG. 1 is a top plan view of a direction finder as used in the combination of the present invention;

FIG. 2 is a side view of the direction finder with driving and pickup coils removed;

FIG. 3 is a rear view of the direction finder;

FIG. 4 to which the principal attention is directed is a novel transistorized control circuit provided in accordance with the invention; and FIG. 5 is a circuit diagram of the oscillator in the background light discriminating device.

FIGS. 6 and 7 are prior art figures, employed by way of background, corresponding to FIGS. 2 and 3 of U.S. patent to Dugle 2,941,117 and being, respectively, a schematic outline view of a mechanism for coordinating the steering linkage of an automobile and the housing of the automatic headlight control system and a sectional view showing the prior art combination of direction finder, head lamps and synchronizing means.

The basic functions of the control circuitry as illustrated in FIG. 4 are as follows:

(1) In response to the presence and relative bearing of the source of light from an oncoming automobile automatically to actuate the vane motor 11 in such a manner that the headlamp vanes 118 and 119 (FIG. 7) are so positioned as to cause a shadow or non-glare area to track the approaching vehicle until it passes or comes alongside the equipped car, the general operation being described in detail in the aforementioned Bone patents, to which reference is made for a full description of the basic system relative to which the present invention constitutes an improvement;

(2) In response to a manual override order for the "flash" condition to turn the vanes 118 and 119 (FIG. 7) to a counterclockwise position, such as characterizes the vanes when there is no oncoming car;

(3) In response to a manual override order for a "search" condition, to turn the vanes 118 and 119 (FIG. 7) to a clockwise position.

Essentially, then what is shown in FIG. 4 is an automatic system of a continuous type with two overrides, and means for causing depression of a push-button to select the proper override.

As to automatic control, the FIG. 4 system comprises the following principal cascaded stages: An oncoming light detector stage including a pair of solar cells 12; an impedance matching and current gain stage including transistor 13; a voltage amplifier stage including transistor 14; a voltage amplifier stage including transistor 15; a voltage amplifier stage including transistor 16; a rectifier stage including a diode 17, a transistor 50 for furnishing base current to transistor 18, and a pair of transistors 18 and 19 for controlling the vane motor 11.

The light signal from an oncoming car is detected by the pair of solar cells 12 (each a Hoffman type 220C). The output of solar cells 12 is a pulsating direct voltage, the pulsations being produced by the light-chopping action of the arcuate chopper 93 shown in FIG. 1. This pulsating direct voltage is coupled by capacitor 21 (2 microfarads) to the base of transistor 13, the capacitive coupling serving to eliminate the direct voltage component of the signal so that an alternating signal voltage appears at point 22 superimposed on a direct voltage bias provided by the voltage divider consisting of resistors 23 (1000 ohms), 24 (2700 ohms), 25 (47,000 ohms), and 20 (47,000 ohms), all connected in series between positive terminal 26 of a direct voltage supply (12 volts) and ground 27, ground being the negative terminal of such source, or the reference point.

Point 22 is connected to the base of transistor 13 (NPN, type 2N1010) which is arranged as an emitter follower stage. The collector of transistor 13 is reverse biased relative to the base by direct connection to resistor 24, the base being connected to that resistor 24 via resistor 25. Emitter resistor 28 (27,000 ohms) is connected between the emitter of transistor 13 and ground. The transistor 13 stage has a high input impedance for matching purposes and it provides substantial current gain.

The next three cascaded stages, comprising transistors 14, 15 and 16, voltage amplify the signal output of transistor 13. These are all arranged as grounded emitter stages for alternating currents.

The emitter output of transistor 13 is applied by blocking capacitor 29 (2 microfarads) to the base of transistor 14 (PNP, type 2N220). The emitter of transistor 14 is positively biased by connection to resistor 24. Connected between the base and collector of this transistor is a resistor 30 (47,000 ohms) and connected between its collector and ground is a resistor 31 (12,000 ohms), these resistors being provided to complete the biasing circuits for base and collector, the collector being reverse or negatively biased relative to the base. The base current flow of transistor 14 is via a path including resistors 31 and 30.

The collector output of transistor 14 is applied via a coupling capacitor 32 (3 microfarads) to the base of transistor 15 (PNP, type 2N220). The emitter of this transistor is positive biased relative to the base by connection to the resistor 23 via resistor 33 (1000 ohms). The base current flow is through resistors 34 (10,000 ohms) and 35, connected in series between the base of transistor 15 and ground, resistor 35 (560,000 ohms) being connected between the collector and base to complete the circuitry for biasing the collector negatively relative to the base.

Resistor 34 is arranged as a potentiometer having an adjustable contact 36, utilized for gain control purposes. The collector output of transistor 15 is applied, via capacitor 37 (3 microfarads) to the base of transistor 16 (PNP, type 2N270). The bias on the base is established by a voltage divider comprising resistor 38 (150 ohms), resistor 39 (15,000 ohms) and resistor 40 (27,000 ohms). The bias on the emitter is established by series resistors 41 (150 ohms) and 38, the former being by-passed by a capacitor 42 (50 microfarads). Inserted between the collector and ground is the primary of a transformer or impedance transforming device 43 for coupling the high impedance collector output of transistor 16 to the low impedance detector stage including rectifier 17.

The circuitry so far described in detail constitutes the means for detecting light and amplifying the A.C. signal output of the solar cells 12. A word is now in order about decoupling arrangements. The emitter of transistor 14 is A.C. decoupled from the power supply (having terminal 26) by series resistor 24 and a shunt capacitor 44 (100 microfarads).

Point 45 in the emitter circuit of transistor 15 is A.C. (alternating-current) decoupled from the power supply by resistor 23 and shunt capacitor 46 (100 microfarads). Point 47 in the emitter circuit of transistor 16 is A.C. decoupled from the power supply by resistor 38 and shunt capacitor 48 (100 microfarads).

It is next in order to consider the rectifying circuitry and control circuitry directly associated with the vane motor 11.

The secondary of the transformer 43 is coupled to a load comprising the series combination of a diode rectifier 17 (1N67) and a capacitor 51 (3 microfarads) and this capacitor is connected between the emitter and base of transistor 50 (PNP, type 2N270) so that the rectifier output is applied to this transistor with polarity proper to render it more conductive the greater the intensity of the signal output of the solar cells 12. At this point it should be noted that a certain rise in the voltage of the collector of transistor 50 causes a relay 52 to trip. The coil of this relay and a resistor 53 (150 ohms) are connected in series between the collector of transistor 50 and ground, capacitor 54 (100 microfarads) also being connected between such collector and ground to prevent relay chatter. This capacitor serves another purpose in that it carries a heavy current when transistor 50 first becomes conductive, thereby assuring a heavy current flow in the base of transistor 18, thus providing rapid turn-on of transistor 18, which is normally turned off, or rendered nonconductive.

Transistor 50 is conductive whenever light of at least the proper intensity is incident on the solar cells 12. In so far as its relation to the searching and flashing circuitry is concerned, relay 52 is analogous to relay 31 shown in Engelmann et al. Patent 2,917,666. That is to say, when the relay 52 is tripped it dictates that when the push button 55 is closed, a flashing operation shall be initiated by depression of 55. When not tripped, a search operation is initiated by depression of 55.

The transistors 18 and 19 control vane motor 11, and therefore perform the same general functions as the tubes 123 and 124 of U.S. patent to Engelmann 2,941,118. However, while in the Engelmann Patent 2,941,118 inputs are supplied directly to both tubes from the signaling system, in the system of the present invention a signal input is supplied to transistor 18 only, and transistor 18 controls transistor 19, whereby a radical simplification is accomplished.

Shunted across the vane motor is an iron core inductance 56, corresponding generally to the inductance 150 in Engelmann patent 2,941,118 for the purpose of aiding rapid reversals of the vane motor 11. The conditions established by the transistors 18 and 19 are such that an increase in the signal output of the solar cells causes point 57 to become relatively more positive. Under conditions when no signal is being generated by the solar cells point 57 is negative relative to point 58. Transistor 18 (PNP type 771) is therefore arranged to be normally off, its emitter being connected to terminal 26, and its collector being connected through resistor 59 (10 ohms) to ground, its base being connected to the emitter of transistor 50. The transistor 19 (PNP type 771) is normally conductive, its emitter being connected to terminal 26 and its collector being connected via resistor 60 (10 ohms) to ground, its base being connected via resistor 61 (56 ohms) to the collector of transistor 18. The effect of signal applied to transistor 18 is to render that transistor 18 conductive, which in turn causes the base of transistor 19 to go positive, thereby cutting off transistor 19. The reason why transistor 19 is normally conductive is because of the fact that its base is connected through resistor 61 to a point of lower potential than the collector of transistor 19. With signal present the base current of transistor 18 raises the collector voltage of transistor 18 to almost 20 volts. When this occurs the base of transistor 19 is positively biased by the voltage existing on capacitor 62 (100 microfarads), which capacitor shunts resistor 61 (56 ohms). For this reason the transistor 19 is cut off very rapidly, causing the vanes to turn clockwise.

On the other hand, when input signal to transistor 18 decreases and disappears, transistor 18 is cut off and then transistor 19 is turned on very rapidly because the collector of transistor 18 has fallen in voltage and the capacitor 62 has been discharged. The vanes then turn counterclockwise.

Thus it will be seen that an increase of signal actuates the vane motor 11 to turn the vanes clockwise and a decrease of signal actuates the vane motor to turn the vanes counterclockwise. In practice, the vane motor 11 oscillates the vane 91 of FIG. 1 very rapidly about the average desired position, the frequency being so high (about 180 cycles per second) and the amplitude so low that there is no noticeable motion of the shadow casting vanes.

From the foregoing the automatic operation of the system will be understood.

Let there now be considered the search and flash overrides. The system operates in such a manner that closing of push button 55 causes the search operation to occur in the event that the system has not picked up on an oncoming car and causes the flash operation to occur in the event that it has. This requires a device which senses whether or not the system has picked up and performs in such a way as automatically to permit the flash operation to occur on order when it has picked up and the search operation to occur when it has not.

Relay 52 is an amplitude sensitive selector device which determines whether a searching or flashing operation will be performed by the actuation of push button 55, searching being performed when the signal input to transistor 50 is below a predetermined threshold (as when an approaching car with dim lights is beyond the dim light pickup range), flashing being performed when such light input is above the threshold value.

The coil of relay 52 is in a series circuit comprising the collector of transistor 50 and resistor 53 (150 ohms), so the relay 52 is energized or tripped when transistor 50 attains the threshold value of conductivity. When relay 52 is energized, as by normal pickup of an oncoming car it dictates that a flashing operation will be initiated when push button switch 55 is closed. The relay 52 controls a pair of normally closed contacts 64 and a pair of normally open contacts 65, through a suit-ganging expedient indicated by the reference numeral 66. Now contacts 64 are in series circuit with the search relay 67 and the contacts 65 are in series circuit with the flash relay 68 so that the opening of contacts 64 and the closing of contacts 65 open circuit or disable the search relay and enable the flash relay. Conversely, when relay 52 has not been tripped the search relay 67 is enabled by normally closed contacts 64 and the flash relay 68 is open circuited by normally open contacts 65. The operation of relay 52 is therefore such that when the threshold value of input signal has been attained the flash relay is enabled and the closing of the push button 55 causes the flashing operation to occur. Now the flash operation occurs in the following manner:

The flashing relay 68 when energized, controls through a suitable ganging expedient 70, several sets of contacts. One of these is a set of contacts 71 in series with the search relay 67, which contacts are opened, upon energization of the flash relay, to disable the search relay 67. Another one of these is the set of normally open contacts 72 which are closed on energization of the flash relay 68. A third set of contacts is 78, which has provided a path to discharge capacitor 74 (50 microfarads) so that the capacitor has no voltage across it at the time of energization of relay 68. Capacitor 74 (with no voltage) and capacitor 75, charged to approximately 10 volts, as thus connected in parallel via line 73. The charge redistributes itself producing a voltage of about 6⅔ volts across the combination. The base of transistor 15 is held at a voltage slightly below 10 volts (the normal operating voltage) by capacitor 32. Transistor 15 then has a reverse-biased base-emitter junction, and is therefore cut off, removing the signal voltage which formerly appeared at the collector of transistor 15. The vanes are then moved in a counterclockwise direction to cause the flashing operation. The parallel combination of capacitors 74 and 75 then charges toward its normal operating value of approximately 10 volts through resistors 23 and 33, placing transistor 15 back in normal operation.

Since loss of signal would cause relay 52 to be deenergized, opening relay contacts 65 and dropping out relay 68, the flash operation could be terminated by this means. However, if push button 55 were still depressed, the termination of the flashing operation would cause relay 52 to be energized once more (since the signal has reappeared), resulting in a second flashing operation. This same cycle would repeat as long as push button 55 is depressed, with consequent annoyance to the oncoming driver. Further, when relay 52 is deenergized, relay 67 would be energized, causing an unwanted search operation. To prevent this operation, normally open relay contacts 77 operated by relay 68 through ganging means 70 cause relay 68 to remain energized until push button 55 is released. It should be noted that relay 67 remains disabled by means of the opening of normally closed contacts 71 controlled by relay 68, and thus normally closed relay contacts 82 controlled via ganging means 80 by search relay 67 will remain closed, enabling relay 68. Thus depression of push button 55 will cause a single flashing operation (assuming relay 52 was previously energized), which may not be repeated unless push button 55 is first released.

When push button 55 is released, capacitor 74 is disconnected from the emitter of transistor 15, and is discharged via normally closed contacts 78, capacitor 75 having already charged to its normal voltage.

Now then, let the conditions for search be considered. In that case, transistor 50 will not have reached the threshold of conductivity. The contacts 65 and 77 will be open, the contacts 64 closed, and the contacts 71 and 78 closed, so that the depression of push button 55 will energize the search relay 67. The search relay will then, via a suitable ganging expedient 80, close holding contacts 81, open contacts 82 to disable the flash relay, and will also close contacts 84 energizing a bulb 85. In that event, the light from bulb 85 impinges on the solar cells 12, produces input signal, and causes the vanes to move clockwise for search, when push button 55 is depressed. The bulb 85 is in circuit with contacts 84 and a dropping resistor 87 (47 ohms), across the power supply.

It has been stated that the signal output of the solar cells 12 is an A.C. signal. This is true because there is interposed between the light sensitive signaling means 12 and the light from the oncoming vehicle, a background light discriminating device. Such a device is illustrated in the Behm and Hecox U.S. Patent 2,878,396, assigned to the same assignee as the present invention and patent application. The improved device of the instant invention comprises a light chopper 93 interposed between the optical sighting system and the light cells 12, which chopper is formed with a plurality of alternate light emitting and light rejecting portions. These portions are so moved in linear reciprocating motion that the signaling device 12 generates alternating current signals indicative of the presence of an oncoming headlight in the field of vision of the optical system.

Reference is made to the Behm and Hecox patent for a complete description of the mode and manner of operation of the basic background light discriminating device. In accordance with the present invention, I combine the direction finder and the light discriminating device into one assembly, which comprises the optical lens 90, the solar cells 12, the angularly movable direction finder vane 91, the vane actuating shaft 92, and an arcuate chopper element 93.

The chopper numbered 93' in FIG. 7 of the present application is identical to that numbered 12 in the Behm et al. Patent 2,878,396. The Behm et al. patent discloses an improvement in the Bone-type direction finder. That improvement prevents the photoelectric cell 12' (FIG. 7) of the prior art from responding to illuminated signs and other large illuminated areas which interfere with the proper operation of the system unless the direction finder is made selectively responsive to light emanating from point sources, such as the headlights of an oncoming car. Accordingly, the Behm et al. patent provides (FIG. 7) a light sensitive device or phototube 12' (FIG. 7) together with a light chopper 93' which is formed with a plurality of light emanating and light intercepting portions. These portions are so dimensioned that the chopper periodically intercepts light emanating from a point source of light and produces an electrical effect indicative of such interception and the presence of such said point source of light. In other words, the chopper 93' (FIG. 7) of the Behm et al. patent prevents the phototube 12' from generating pulse signals when a point source of light is not approaching the car in which the system is installed. In the present invention, I provide, interalia, the improved chopper element 93 (FIG. 1) as an advance over the Behm et al. rotating chopper. The invention utilizes a solar cell 12 and improved electronic circuitry in lieu of the photocell 12' of the prior art (FIG. 7).

The chopper 93 is interposed between the vane and the light detector 12. The chopper or discriminator element is provided with slits so that it is characterized by alternate light transmitting and light rejecting portions, after the manner of the Behm and Hecox element 93' (FIG. 7 of the present application) which is therein called a discriminator cylinder. It will be seen that in lieu of a rotatably movable discriminator cylinder, the present invention utilizes a discriminating element 93, which is reciprocated back and forth over a relatively small arc by a magnet 95, driven by a coil 96. The arcuate chopper member is mounted on springs 97 and 98 and is simply vibrated by the action of elements 95 and 96, to the end that the light emitted to the solar cells 12 is pulsating.

The chopper is positioned by the driving magnet 95 which is secured to and movable with the chopper. Also secured to the chopper is another magnet 99 which projects into a pickup coil 100. The coils 96 and 100 are secured to an upstanding bracket. The pick-up and drive coils are elements of an electromechanical oscillator, the signal output of the pick-up coil being amplified by the transistors 103, 102 and 101, these three transistors being connected in the manner illustrated in FIG. 4.56 at page 132 of Transistor Circuit Engineering, Shea, John Wiley, New York (1957), the pick-up coil and coupling capacitor 105 being connected between the base of transistor 103 and ground and the driving coil being connected between all of the collectors and ground. Connected between said collectors and the base of transistor 103 is a biasing resistor 104.

The chopper 93, springs 97 and 98, magnets 95 and 99, drive coil 96, and pick-up coil 100 (FIG. 3), together with the associated circuitry comprising transistors 101 (2N669), 102 (2N270), and 103 (2N1623), and with bias resistors 104 (470,000 ohms) and coupling capacitor 105 (0.25 microfarad), constitute an electromechanical oscillator. Transistors 101, 102 and 103 are arranged in a super-alpha connection in order to provide high gain and high input impedance. Motion of the chopper 93 and magnet 99 causes an induced voltage in pickup coil 100. This voltage is coupled by capacitor 105 to the base of transistor 103, is amplified in turn by transistors 103, 102 and 101, causing a current change in drive coil 96, and changing the force on magnet 95. The directions of winding of coils 96 and 100 and the polarities of magnets 95 and 99 are so chosen as to cause the action described above to be regenerative. Further, the gain around the loop, including mechanical effects, is greater than one, and hence the system will oscillate. The frequency of oscillation is determined by the mass of chopper 93 and magnets 95 and 99, and the spring constants of springs 97 and 98.

While there has been shown and described what is at present considered to be the preferred embodiment of the invention, it will be understood by those skilled in the art that various changes and modifications may be made therein without departing from the true scope of the invention as defined in the appended claims.

Having fully disclosed my invention, I claim:

1. In a vehicle headlighting system adapted to be installed in a vehicle, a direction finder for sensing the approach and measuring the relative bearing of a light source carried by an oncoming vehicle comprising in combination: A solar cell located in the first mentioned vehicle, a vane disposed between said cell and said source and adapted to be positioned in azimuth in accordance with said bearing by controlling admission of light to said cell, electromechanical means for continuously positioning said vane, electronic circuit means intercoupling said solar cell and said electromechanical means for conditioning the output of said cell to drive said electromechanical means discriminator means disposed between said vane and said cell periodically interrupting the passage of light from said source to said solar cell so that the output signals of said cell are pulsating currents, the electronic circuit means comprising a plurality of transistor stages for amplifying said pulsating currents, a rectifier for changing the output of said stages to direct currents, and transistor driving means coupled to said rectifier for responding to said direct currents to drive said electromechanical means.

2. In a vehicle headlighting system a direction finder in accordance with claim 1 in which the electronic circuit means further comprises a supply of biasing currents having positive and negative terminals and in which the transistor driving means comprises first and second PNP transistors each having an emitter, collector and base, both emitters being connected to the positive terminal of said supply, a first resistance between the collector of the first transistor and said negative terminal, a second resistance between the collector of the second transistor and said negative terminal, a parallel combination of resistance and capacitance connected between the collector of the first transistor and the base of the second transistor, the electromechanical means being connected between said collectors with such polarity that an increase in the signal output of the solar cell causes the collector of the first transistor to become relatively less negative, the first transistor being non-conductive and the second transistor being conductive in the absence of input signals but input signals to the solar cell causing the first transistor to become conductive and the second transistor to become non-conductive so that the vane turns clockwise.

3. In a vehicle headlighting system, a direction finder for sensing the approach and measuring the relative bearing of a light source carried by an oncoming vehicle comprising, in combination: A solar cell, an arcuate vane curved in azimuth and adapted to be continuously positioned in azimuth in accordance with said bearing by controlling the admission of light to said cell, electromechanical means for positioning said vane, electronic circuit means intercoupling said cell and said electromechanical means for conditioning the output of said cell to drive said electromechanical means, and discriminator means periodically interrupting the passage of light from said source to said solar cell so that the output signals of said solar cell are pulsating currents, the discriminator means comprising a linearly movable curved element disposed between the vane and the cell and having a plurality of alternating arranged light-admitting and light intercepting portions, said element being curved in azimuth.

4. In a vehicle headlighting system, the combination in accordance with claim 3, cantilever spring means for mounting said curved element and means including driving and pick-up magnets for driving the element.

5. In a vehicle headlighting system, the combination in accordance with claim 4 in which the lastmentioned means includes a driving coil into which the driving magnet projects and a pick-up coil into which the pick-up magnet projects.

6. In a vehicle headlighting system, the combination in accordance with claim 5 in which said last-mentioned means further includes a compound connected transistor regenerative amplifier having its input connected to the pick-up coil and its output connected to the driving coil.

7. In a vehicle headlighting system, a direction finder for sensing the approach and measuring the relative bearing of a light source carried by an oncoming vehicle comprising, in combination: A solar cell, a vane adapted to be continuously positioned in azimuth in accordance with said bearing by controlling admission of light to said cell, electromechanical means for positioning said vane, electronic circuit means intercoupling said solar cell and said electromechanical means for conditioning the output of said cell to drive said electromechanical means, said electronic circuit means comprising a plurality of stages for amplifying the output of said solar cell, rectifying means, transistor driving means coupled to the rectifying means for driving the electromechanical means, and transistor current-supply means connected to the transistor driving means to indicate whether or not the received signals have attained a predetermined level.

8. In a vehicle headlighting system a direction finder in accordance with claim 7 in which the transistor driving means comprises two transistors each having an emitter and a collector and a base, and in which the current supply means furnishes base current for one of said pair of transistors.

9. In a vehicle headlighting system a direction finder in accordance with claim 8 and selector means in circuit with the transistor current supply means for making a decision as to whether or not said predetermined level has been attained.

10. In a vehicle headlighting system a direction finder in accordance with claim 9, a manual operator, and means responsive to operation of the manual operator for causing the vanes to turn counterclockwise when said predetermined level has been attained and clockwise when said level has not been attained, the last-mentioned means being controlled by the current supply means.

11. In a vehicle headlighting system a direction finder in accordance with claim 10 in which the means for turning the vane counterclockwise includes capacitor-switching means for momentarily applying a reverse bias to one of said stages.

References Cited in the file of this patent
UNITED STATES PATENTS

| | | |
|---|---|---|
| 2,753,487 | Bone | July 3, 1956 |
| 2,759,124 | Willis | Aug. 14, 1956 |
| 2,795,736 | Dilks | June 11, 1957 |
| 2,878,396 | Behm et al. | Mar. 17, 1959 |
| 2,913,636 | Morrow | Nov. 17, 1959 |
| 2,941,117 | Dugle | June 14, 1960 |
| 3,005,374 | Thomas | Oct. 24, 1961 |